US010990799B2

(12) United States Patent
Cernautan

(10) Patent No.: US 10,990,799 B2
(45) Date of Patent: Apr. 27, 2021

(54) DIGITIZING HANDWRITTEN SIGNATURES

(71) Applicant: CRF Box Oy, Helsinki (FI)

(72) Inventor: Ovidiu Cernautan, Lasi (RO)

(73) Assignee: ORF Box Oy, Helsinki (FI)

( * ) Notice: Subject to any disclaimer, the term of this patent is extended or adjusted under 35 U.S.C. 154(b) by 169 days.

(21) Appl. No.: 16/424,572

(22) Filed: May 29, 2019

(65) Prior Publication Data

US 2019/0370528 A1 Dec. 5, 2019

(30) Foreign Application Priority Data

Jun. 1, 2018 (FI) ...................................... 20185503

(51) Int. Cl.
*G06K 9/00* (2006.01)
*G06K 19/06* (2006.01)
*H04N 5/232* (2006.01)

(52) U.S. Cl.
CPC ..... *G06K 9/00161* (2013.01); *G06K 9/00463* (2013.01); *G06K 19/06037* (2013.01); *H04N 5/23212* (2013.01)

(58) Field of Classification Search
CPC ......... G06K 19/06037; G06K 9/00161; G06K 9/00449; G06K 9/00463
See application file for complete search history.

(56) References Cited

U.S. PATENT DOCUMENTS

| 2011/0123115 A1* | 5/2011 | Lee ..................... H04N 5/23264 382/185 |
| 2012/0323796 A1* | 12/2012 | Udani ..................... G16H 20/17 705/80 |
| 2015/0178592 A1* | 6/2015 | Ratcliff ..................... G06T 7/00 382/155 |

FOREIGN PATENT DOCUMENTS

| EP | 1605368 A1 | 12/2005 |
| WO | 2015065386 A1 | 5/2015 |

OTHER PUBLICATIONS

Search Report of the Finnish Patent and Registration Office, dated Oct. 5, 2018, 1 page.

\* cited by examiner

*Primary Examiner* — Ross Varndell
(74) *Attorney, Agent, or Firm* — Ziegler IP Law Group, LLC

(57) ABSTRACT

The present disclosure allows digitizing handwritten signatures efficiently. A live stream of image frames is received from a digital camera unit of an electronic device. The received image frames are displayed and a guideline pattern defining a first target area and a second target area is overlaid. The content of a first image frame section of a current frame overlaid by the first target area is read. A multidimensional machine-readable code decoder is applied to the read content in order to interpret the read content. If the read content is successfully interpreted and if a precondition is met, a second image frame section of the current image frame overlaid by the second target area is captured.

29 Claims, 6 Drawing Sheets

DIGITIZING HANDWRITTEN SIGNATURES

BACKGROUND

Field

The present application generally relates to signature acquisition. In particular, the present application relates to digitizing handwritten signatures.

Description of the Related Art

In the business world, there are situations where an affirmation needs to be enforced by the signature of the person that makes the statement. As an example, a participant needs to express his/her consent for participation in a clinical trial. Furthermore, the consent document needs to be signed.

Usually, the signature is in the form of wet ink on a paper support. That is, a person writes (signs) his/her name with his/her own hands upon a paper document by ink pen or the like.

Alternatively, in the modern world, digital or electronic alternatives may also by accepted in some situations.

One form of the digital version of a signature is a special Digital Certificate that is uniquely associated with a real person or a business entity.

Another option is to use a digital device that allows the user to 'draw' the signature on screen or on another input device, like a smartphone, tablet or a drawing device that is connected to a personal computer. For example, the user may draw his signature using a finger or a stylus. However, the problem is that people are not used to signing a document using their finger and even if they do it, it will not look like the one done using a pen. There are various 'stylus' options but the resolution does not match a scanned wet ink signature document.

Yet another option is a scanned version of a wet ink signature. Here, a person writes his/her signature on paper using ink or the like, and then the signed-on-paper document is digitized via scanning. However, this is a complex process and requires additional hardware like a scanner and usually also a personal computer or the like for post-processing the scanned document.

One more option is to use specialized software on a smartphone or tablet that will use a photograph of the document (obtained e.g. with the built-in camera) as input. Such applications use complex algorithms and a lot of computing power to identify the actual signature in the photograph. Due to lighting issues and the angle of the smartphone/table that is used to take the photograph, the final image quality is not guaranteed, scaling information is hard to identify, and the final form of the signature can be very different from that of the actual on-paper signature.

If the camera is not properly aligned with the document to be photographed, the signature will be skewed/distorted which may be unacceptable, particularly in the case of legal documents and the like. Similarly, if the camera is too far from the document, the signature may not be legible enough in the resulting photograph.

Furthermore, the current options are not efficient for obtaining digitized signatures from a large volume of people, such as participants in clinical trials.

SUMMARY

An embodiment of an electronic device comprises a display, a digital camera unit, at least one processor, and at least one memory comprising computer program code. The at least one memory and the computer program code are configured to, with the at least one processor, launch an application configured to cause the electronic device to at least:

receive a live stream of image frames from the digital camera unit;

display the received live stream of image frames on the display;

display a guideline pattern on the display overlaid on the displayed live stream of image frames, the guideline pattern defining at least a first target area and a second target area;

read the content of a first image frame section of a current image frame of the received live stream of image frames, the first image frame section being overlaid by the first target area;

apply a multidimensional machine-readable code decoder to the read content in order to interpret the read content; and in response to successfully interpreting the read content and further in response to a precondition being met:

capture at least a second image frame section of said current image frame, the second image frame section being overlaid by the second target area.

In an embodiment, alternatively or in addition to the above described embodiments, the successfully interpreted read content comprises document information identifying a document associated with a handwritten signature within the second image frame section.

In an embodiment, alternatively or in addition to the above described embodiments, the precondition comprises the successfully interpreted read content comprising signature information indicating the presence of a handwritten signature within the second image frame section.

In an embodiment, alternatively or in addition to the above described embodiments, the precondition comprises the first image frame section and the second image frame section being successfully recognized as containing a first region for a multidimensional machine-readable code and a second region for a handwritten signature, respectively.

In an embodiment, alternatively or in addition to the above described embodiments, the application is further configured to cause the electronic device to:

store the captured at least second image frame section at the electronic device.

In an embodiment, alternatively or in addition to the above described embodiments, the application is further configured to cause the electronic device to:

store the document information in association with the stored at least second image frame section.

In an embodiment, alternatively or in addition to the above described embodiments, the application is further configured to cause the electronic device to:

transmit at least the captured second image frame section to a storage server.

In an embodiment, alternatively or in addition to the above described embodiments, the precondition further comprises the document identified by the document information being recognized by the application.

In an embodiment, alternatively or in addition to the above described embodiments, the precondition further comprises recognizing that the second image frame section is not blank.

In an embodiment, alternatively or in addition to the above described embodiments, the application is further configured to cause the electronic device to:

display the second target area closer to the center of the display than the first target area.

In an embodiment, alternatively or in addition to the above described embodiments, the application is further configured to cause the electronic device to:

apply at least one of automatic focus adjustment or automatic exposure adjustment of the digital camera unit.

In an embodiment, alternatively or in addition to the above described embodiments, the document information further identifies at least one of: a clinical trial, a clinical trial participant, consent of the clinical trial participant, a clinical trial site, a clinical trial sponsor, a clinical trial type, one or more standard protocols used in a clinical trial, a clinical trial phase, or a clinical trial blinding type, associated with the document.

In an embodiment, alternatively or in addition to the above described embodiments, the application is deployed at the electronic device.

In an embodiment, alternatively or in addition to the above described embodiments, the application is deployed at an application server and launched remotely with the electronic device.

In an embodiment, alternatively or in addition to the above described embodiments, the multidimensional machine-readable code comprises a quick response, QR, code.

An embodiment of a method of signature digitizing comprises:

receiving, at an electronic device, a live stream of image frames from a digital camera unit of the electronic device;

displaying the received live stream of image frames on a display of the electronic device;

displaying a guideline pattern on the display overlaid on the displayed live stream of image frames, the guideline pattern defining at least a first target area and a second target area;

reading, by the electronic device, the content of a first image frame section of a current image frame of the received live stream of image frames, the first image frame section being overlaid by the first target area;

applying, by the electronic device, a multidimensional machine-readable code decoder to the read content in order to interpret the read content; and in response to successfully interpreting the read content and further in response to a precondition being met:

capturing, by the electronic device, at least a second image frame section of said current image frame, the second image frame section being overlaid by the second target area.

In an embodiment, alternatively or in addition to the above described embodiments, the successfully interpreted read content comprises document information identifying a document associated with a handwritten signature within the second image frame section.

In an embodiment, alternatively or in addition to the above described embodiments, the precondition comprises the successfully interpreted read content comprising signature information indicating the presence of a handwritten signature within the second image frame section.

In an embodiment, alternatively or in addition to the above described embodiments, the precondition comprises the first image frame section and the second image frame section being successfully recognized as containing a first region for a multidimensional machine-readable code and a second region for a handwritten signature, respectively.

In an embodiment, alternatively or in addition to the above described embodiments, the method further comprises:

storing the captured at least second image frame section at the electronic device.

In an embodiment, alternatively or in addition to the above described embodiments, the storing of the captured at least second image frame section further comprises storing the document information in association with the stored at least second image frame section.

In an embodiment, alternatively or in addition to the above described embodiments, the method further comprises:

transmitting at least the captured second image frame section to a storage server.

In an embodiment, alternatively or in addition to the above described embodiments, the precondition further comprises recognizing the document identified by the document information.

In an embodiment, alternatively or in addition to the above described embodiments, the precondition further comprises recognizing that the second image frame section is not blank.

In an embodiment, alternatively or in addition to the above described embodiments, the displaying of the guideline pattern comprises displaying the second target area closer to the center of the display than the first target area.

In an embodiment, alternatively or in addition to the above described embodiments, the method further comprises:

applying at least one of automatic focus adjustment or automatic exposure adjustment of the digital camera unit.

In an embodiment, alternatively or in addition to the above described embodiments, the document information further identifies at least one of: a clinical trial, a clinical trial participant, consent of the clinical trial participant, a clinical trial site, a clinical trial sponsor, a clinical trial type, one or more standard protocols used in a clinical trial, a clinical trial phase, or a clinical trial blinding type, associated with the document.

In an embodiment, alternatively or in addition to the above described embodiments, the multidimensional machine-readable code comprises a quick response, QR, code.

An embodiment of a computer program product comprises at least one computer-readable storage medium, the computer-readable storage medium comprising a set of instructions, which, when executed by one or more processors, cause an electronic device to at least perform:

receiving a live stream of image frames from a digital camera unit of the electronic device;

displaying the received live stream of image frames on a display of the electronic device;

displaying a guideline pattern on the display overlaid on the displayed live stream of image frames, the guideline pattern defining at least a first target area and a second target area;

reading the content of a first image frame section of a current image frame of the received live stream of image frames, the first image frame section being overlaid by the first target area;

applying a multidimensional machine-readable code decoder to the read content in order to interpret the read content; and in response to successfully interpreting the read content and further in response to a precondition being met:

capturing at least a second image frame section of said current image frame, the second image frame section being overlaid by the second target area.

At least some of the embodiments allow obtaining digitized signatures efficiently. In particular, at least some of the embodiments allow obtaining digitized signatures efficiently from a large volume of people, such as participants in clinical trials.

At least some of the embodiments allow producing an outcome that is as good as the 'paper scanning' process picture quality wise, but is easier to use, faster and uses commonly available tools, such as a smart phone or a tablet. The result is an image that accurately represents the wet ink signature.

At least some of the embodiments allow signature acquisition that is as simple as scanning a QR Code.

At least in some of the embodiments the end-user does not need additional hardware besides a smartphone or tablet with a digital camera.

At least some of the embodiments allow the end-user to draw a signature with the tool of choice, pen, pencil, etc. on familiar medium, such as paper. This is useful especially for people that are not comfortable with technology but can still draw a signature on paper. Drawing with a stylus or finger on a display screen might be difficult for some people.

At least some of the embodiments do not require heavy image processing on a mobile device nor a fast internet connection for implementations in which the image is processed remotely. Lower CPU usage means less power is drawn from the mobile device battery. Furthermore, in the case photographing signatures, using little or no post-processing (so that the image of the signature remains unaltered) may be required or advisable.

At least some of the embodiments allow linking or associating the signature with its document easily and unambiguously because the multidimensional code contains the unique identifier of document.

Since mobile devices able to scan QR codes are common nowadays, the approach in accordance with at least some of the embodiments is well suited for a BYOD (Bring Your Own Device) approach.

At least some of the embodiments allow storing the photograph of the QR code and the wet ink signature which can be considered proof of a link of the signature to the document uniquely identified by the identifier contained in the QR code.

BRIEF DESCRIPTION OF THE DRAWINGS

The accompanying drawings, which are included to provide a further understanding of the present disclosure and constitute a part of this specification, illustrate embodiments of the disclosure and together with the description help to explain the principles described in this disclosure. In the drawings.

Like reference numerals are used to designate like parts in the accompanying drawings.

DETAILED DESCRIPTION

Reference will now be made in detail to embodiments of the present disclosure, examples of which are illustrated in the accompanying drawings. The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

The embodiments provide a tool for digitizing signatures. The embodiments improve the overall speed of the digitizing process and the quality of the image that represents a digitized version of a wet ink signature while using a built-in camera of an electronic device, such as smart phone or a tablet computer. For this, a printed unsigned document may contain a special printed marker, such as a QR code or the like. When an entity can control the printed document (e.g. its content and layout) that needs to be signed, the same entity can obtain a digitized version of a wet ink signature in a fast, reliable, and highly accurate way via commonly available hardware the user may already own, such as a smartphone or tablet that has a built-in camera. In an example, the embodiments may be used when an entity (such as a company) needs consent signatures from a large volume of users on documents that the same entity controls. The embodiments allow collecting these signatures from multiple people with minimal effort and costs.

Figure 4:
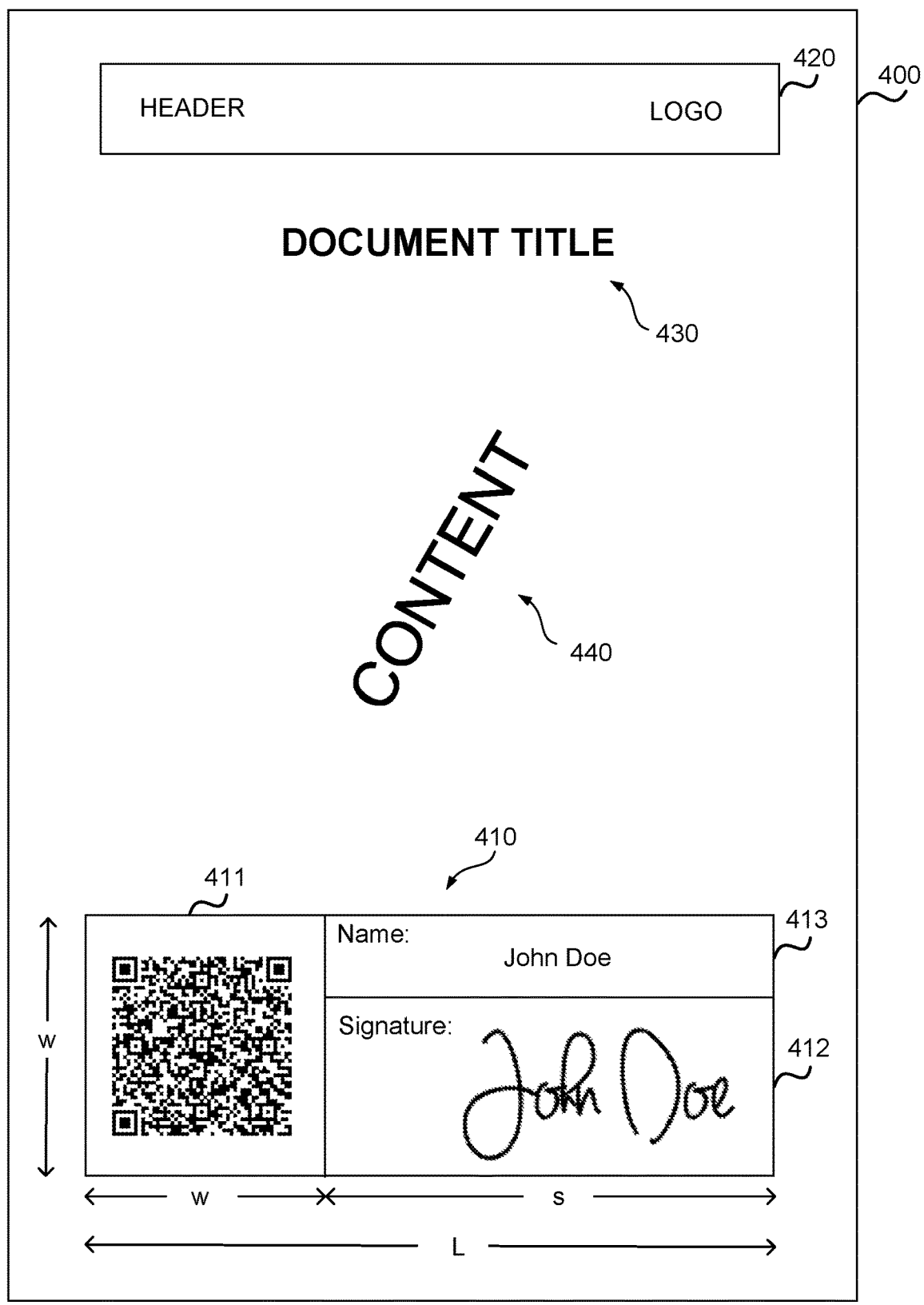
FIG. 4 illustrates an example document that includes a handwritten signature to be digitized, in accordance with an example embodiment.

FIG. 4 illustrates an example document 400 that includes a handwritten signature to be digitized, in accordance with an example embodiment. In the example of FIG. 4, the document 400 is a printed paper document with a wet ink signature template. However, the embodiments are not limited to paper documents and wet ink signatures. Instead, any document and signature format that can be captured with a digital camera may be used. It is to be understood that the following sections and sub-sections and their shapes and dimensions are examples only. Furthermore, borders of the various sections and sub-sections need not be printed or otherwise made visible to the end-user, but they can act as points of reference for the end-user when visible.

The document 400 comprises a signature section 410. In the example of FIG. 4, the signature section 410 is a rectangle that comprises three sub-sections: a machine-readable code sub-section 411, a wet ink signature sub-section 412, and a name sub-section 413.

The machine-readable code sub-section 411 may contain a machine-readable multidimensional code (e.g. a QR code) in which a numeric identifier may be embedded that uniquely identifies the document 400. As described below, additional information may also be embedded in this machine-readable multidimensional code. The machine-readable multidimensional code may be printed on the sub-section 411 before providing the end-user with the document 400 for signing. It is to be understood that herein the term "multidimensional code" refers to a code that contains information in two physical dimensions (such as horizontal and vertical dimensions). Optionally, a multidimensional code may additionally contain information in one or more logical dimensions (such as color).

A QR code (Quick Response Code) is a type of matrix barcode or two-dimensional barcode. A QR code comprises black squares arranged in a square grid on a white background, which can be read by an imaging device such as a camera, and processed using ReedSolomon error correction until the image can be appropriately interpreted. The embedded information may then be extracted from patterns that are present in both horizontal and vertical components of the image. However, it is to be understood that the embodiments are not limited to QR codes. Instead, any machine-readable 2D code may be used. Examples of usable machine-readable 2D codes include QR code Model 1, QR code Model 2, Micro QR code, iQR code, SQRC, Frame QR, and Microsoft Tag.

The multidimensional machine-readable code may be a black and white code, a color code, or a combination of black and white code portions(s) and color code portion(s). For example, a multidimensional code may comprise a printed or laser etched code that may include additional color(s) besides a main color that offer good contrast with a background color. A multidimensional code may be printed on any suitable platform or object.

The wet ink signature sub-section 412 is the area in which the end-user writes his/her signature. The optional name sub-section 413 is the area in which the end-user may write his/her name in lettering. Alternatively, the name of the end-user may have been printed in the name sub-section 413 before providing the end-user with the document 400 for signing.

The document 400 may comprise additional sections, such as section 420 which contains a document header and a company logo. Furthermore, the document 400 may comprise e.g. a title 430 and the actual document content 440.

The document 400 may be provided to the end-user as a printed document, or it may be provided e.g. as a PDF (Portable Document Format) document or the like that the end-user may print.

In an embodiment, at least some of the dimension of the signature section 410 and/or its sub-sections may be predetermined to allow accurately determining the dimensions of the wet ink signature. As an example, the width of the signature section 410 may be 'L', the height of the signature section 410 may be 'w', both the width and height of the machine-readable code sub-section 411 may be 'w', and the width of both the wet ink signature sub-section 412 and the name sub-section 413 may be 's'. In an example, 'w' may be substantially two centimeters. When the printed multidimensional code has a known size, the scale of the signature can also be determined. For example, if the multidimensional code is 2 cm by 2 cm in size, the dimensions of the signature can also be identified because the multidimensional code and the wet ink signature will both be present in the camera view/image.

At least in some of the embodiments, the multidimensional code may allow linking the wet ink signature with the document 400, since the multidimensional code may comprise a unique identifier of the document 400. At least in some of the embodiments, the multidimensional code may allow identifying the dimensions of the wet ink signature since the dimensions of the multidimensional code and their relationship to the dimensions of the wet ink signature area may be known. At least in some of the embodiments, the multidimensional code may facilitate the end-user to easily align the digital camera in order to provide a good quality image to be captured of the wet ink signature. When the multidimensional code is successfully interpreted by the embodiments, that is the moment that the photograph of the signature has good quality (in regards to e.g. exposure, focus and/or size).

Figure 1:
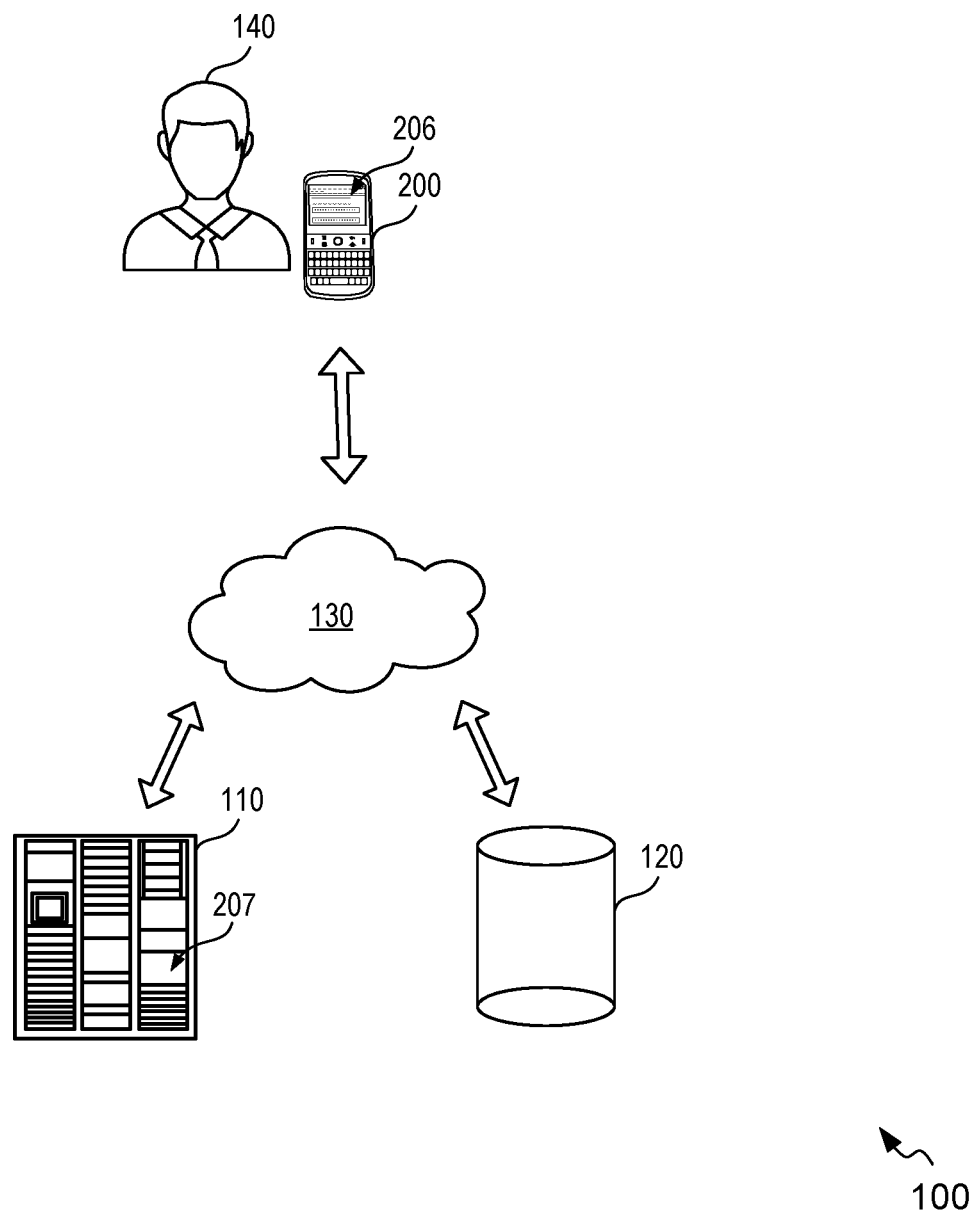
FIG. 1 illustrates an example system, where various embodiments of the present disclosure may be implemented.

FIG. 1 illustrates an example system 100, where various embodiments of the present disclosure may be implemented. An example representation of the system 100 is shown depicting a network 130 that connects entities such as an end-user 140 with an electronic device 200 and an application server 110, as well as a storage server 120. The network 130 may be a centralized network or may comprise a plurality of sub-networks that may offer a direct communication between the entities or may offer indirect communication between the entities. Examples of the network 130 include wireless networks, wired networks, and combinations thereof. Some non-exhaustive examples of wireless networks may include wireless local area networks (WLANs), Bluetooth or Zigbee networks, cellular networks and the like. Some non-exhaustive examples of wired networks may include Local Area Networks (LANs), Ethernet, Fiber Optic networks and the like. An example of a combination of wired networks and wireless networks may include the Internet.

The electronic device 200 may be used to store and run an application 206 for signature digitizing. Alternatively, an application 207 for signature digitizing deployed at the application server 110 may be launched remotely by the electronic device 200, e.g. via accessing a web page that includes code that enables remote control of a digital camera unit 214 of the electronic device 200 for the application 207. Such code may be implemented e.g. with a suitable application programming interface (API) of HTML5 (Hypertext Markup Language, version 5) or the like.

Figure 6:
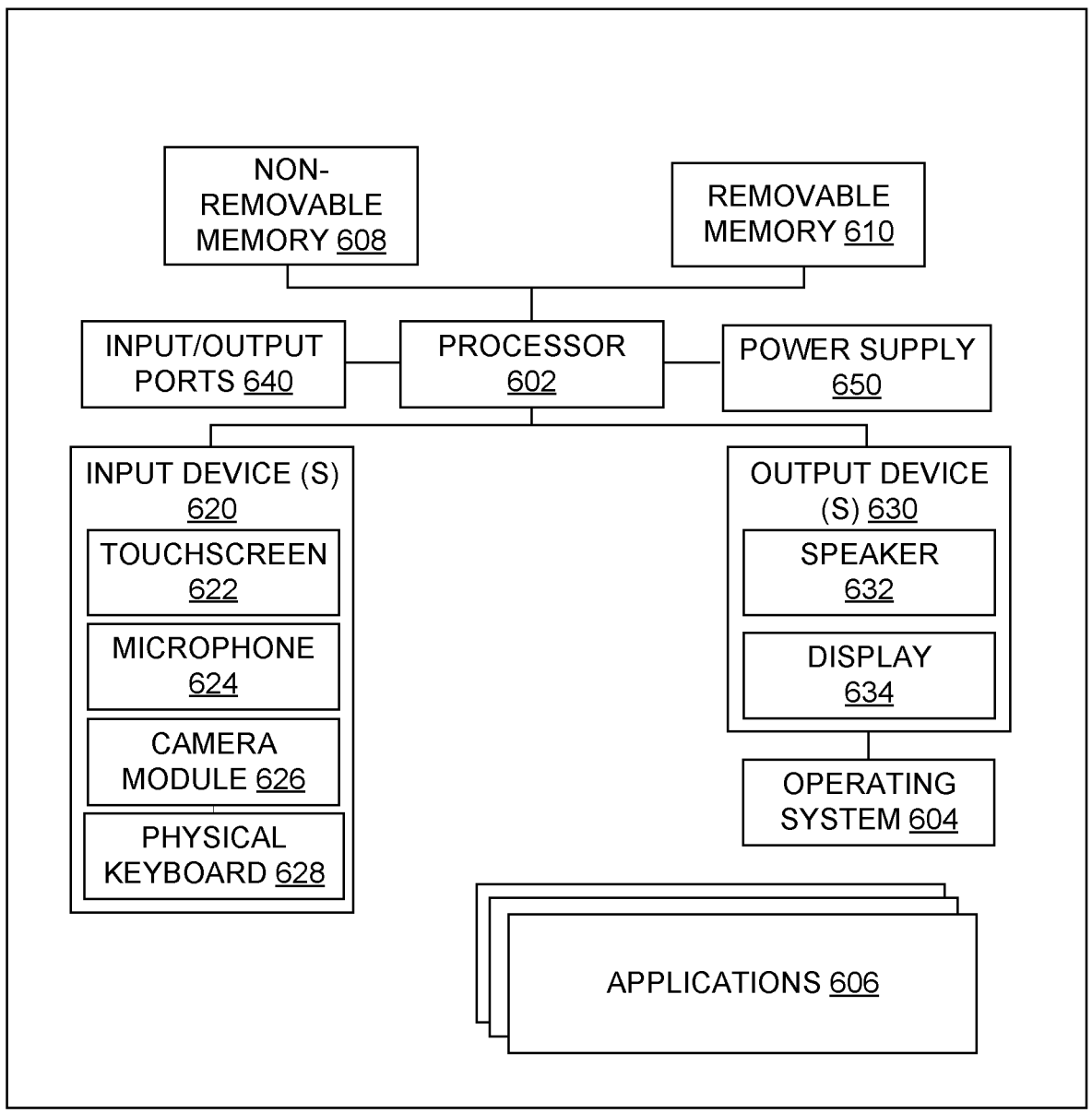
FIG. 6 illustrates an example of an electronic device capable of implementing example embodiments described herein.

The electronic device 200 may include e.g. the electronic device 600 of FIG. 6. The electronic device 200 may include a portable device with a digital camera unit. Examples of the device 200 include, but are not limited to, mobile devices and wearable devices, such as smartphones, tablets, smart watches, and other smart devices. In an embodiment, examples of the device 200 include, but are not limited to, devices with a digital camera unit and having capability to participate in electronic clinical trials (such as electronic patient diaries) and/or electronic informed consent processes.

The device 200 may utilize the application server 110 and/or the storage server 120. For example, the image frame sections captured in the various embodiments described herein may be stored in the storage server 120. Furthermore, the stored image frame sections may be linked/associated with related document information as described herein. The stored image frame sections and the associated documents may relate to e.g. informed consent processes of clinical trials. The informed consent process is a part of overall clinical trial process. It is performed to fulfill regulatory requirement of obtaining informed consent. The informed consent process is a process by which a participant voluntarily confirms his or her willingness to participate in a clinical trial after having been informed of all aspects of the clinical trial that are relevant to the participant's decision to participate in the clinical trial.

Figure 2:
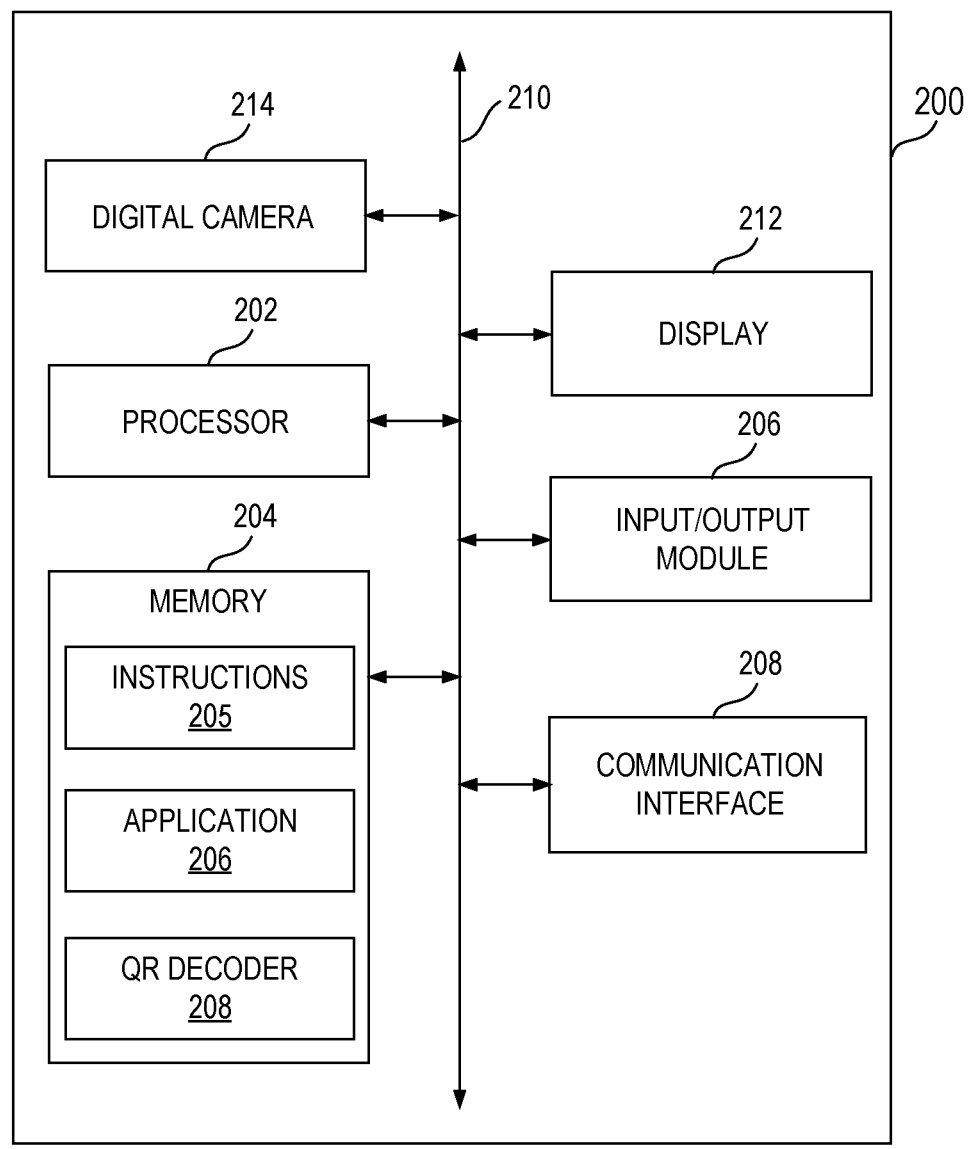
FIG. 2 is a block diagram of an electronic device configured to digitize signatures, in accordance with an example embodiment.

FIG. 2 is a block diagram of an electronic device 200 that is configured to digitize signatures, in accordance with an example embodiment.

The electronic device 200 comprises a display 212, one or more processors 202, and one or more memories 204 that comprise computer program code 205. The one or more memories 204 may further comprise an application 206 that the electronic device 200 may run for signature digitizing. Alternatively, a remote application 207 may be run for the signature digitizing. The one or more memories 204 may further comprise a multidimensional machine-readable code decoder 208 that is configured to decode machine-readable multidimensional codes, such as QR codes and the like. As discussed above in more detail, the machine-readable multidimensional code may include e.g. a machine-readable 2D code or a machine-readable 3D code.

The electronic device 200 may also include an input/output module 206, a communication interface 208, and a digital camera unit 214.

Although the electronic device 200 is depicted to include only one processor 202, the electronic device 200 may include more processors. In an embodiment, the memory 204 is capable of storing instructions 205 (e.g. an operating system and/various applications), application 206 and/or multidimensional machine-readable code decoder 208. Furthermore, the processor 202 is capable of executing the stored instructions 205, application 206 and multidimensional machine-readable code decoder 208. In an embodiment, the processor 202 may be embodied as a multi-core processor, a single core processor, or a combination of one or more multi-core processors and one or more single core processors. For example, the processor 202 may be embodied as one or more of various processing devices, such as a coprocessor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an embodiment, the processor 202 may be configured to execute hard-coded functionality. In an embodiment, the processor 202 is embodied as an executor of software instructions, wherein the instructions may specifically configure the processor 202 to perform the algorithms and/or operations described herein when the instructions are executed.

The memory 204 may be embodied as one or more volatile memory devices, one or more non-volatile memory devices, and/or a combination of one or more volatile memory devices and non-volatile memory devices. For example, the memory 204 may be embodied as semiconductor memories (such as mask ROM, PROM (programmable ROM), EPROM (erasable PROM), flash ROM, RAM (random access memory), etc.).

The input/output module (hereinafter referred to as 'I/O module') 206 is configured to facilitate provisioning of an output and/or receiving an input. The I/O module 206 is configured to be in communication with the processor 202 and the memory 204. Examples of the I/O module 206 include, but are not limited to, an input interface and/or an output interface. Examples of the input interface may include, but are not limited to, a keypad, a touch screen, soft keys, a microphone, and the like. Examples of the output interface may include, but are not limited to, a display such as a light emitting diode display, a thin-film transistor (TFT) display, a liquid crystal display, an active-matrix organic light-emitting diode (AMOLED) display, a microphone, a speaker, a ringer, a vibrator, and the like. In an example embodiment, the processor 202 may include I/O circuitry configured to control at least some functions of one or more elements of the I/O module 206, such as, for example, a speaker, a microphone, a display, and/or the like. The processor 202 and/or the I/O circuitry may be configured to control one or more functions of the one or more elements of the I/O module 206 through computer program instructions, for example, software and/or firmware, stored on a memory, for example, the memory 204, and/or the like, accessible to the processor 202.

In an embodiment, the I/O module 206 may be configured to provide a user interface (UI) configured to provide options or any other display to a user of the electronic device 200. In addition, the I/O module 206 may be integrated with mechanisms configured to receive inputs from the user of the electronic device 200.

The communication interface 208 may enable the electronic device 200 to communicate with other devices. In an embodiment, various components of the electronic device 200, such as the processor 202, the memory 204, the I/O module 206 and the communication interface 208 are configured to communicate with each other via or through a centralized circuit 210. The centralized circuit 210 may be various devices configured to, among other things, provide or enable communication between the components (202-208 and 212) of the electronic device 200. In certain embodiments, the centralized circuit 210 may be a central printed circuit board (PCB) such as a motherboard, a main board, an electronic device board, or a logic board. The centralized circuit 210 may also, or alternatively, include other printed circuit assemblies (PCAs) or communication channel media.

In an embodiment, the digital camera unit 214 comprises at least an optical system including a lens arrangement and an image sensor, such as a charge-coupled device (CCD) sensor or a complementary metal-oxide-semiconductor (CMOS) sensor. As such, the digital camera unit 214 may include all the hardware and software for creating a digital image file from a captured image. Alternatively, the digital camera unit 214 may include the hardware needed to view an image, while the memory 204 of the electronic device 200 stores instructions for execution by the processor 202 in the form of a software to create a digital image file from a captured image. In an example embodiment, the digital camera unit 214 may further include a processing element such as a co-processor, which assists the processor 202 in processing image data and an encoder and/or decoder for compressing and/or decompressing image data. Furthermore, the digital camera unit 214 is configured to provide live image data (viewfinder image data) to the display 212.

In an embodiment, the multidimensional machine-readable code decoder 208 may utilize ReedSolomon error correction.

The electronic device 200 as illustrated and hereinafter described is merely illustrative of an electronic device that could benefit from embodiments of the invention and, therefore, should not be taken to limit the scope of the invention. It is noted that the electronic device 200 may include fewer or more components than those depicted in FIG. 2.

The one or more memories 204 and the computer program code 205 are configured to, with the one or more processors 202, launch the application 206 or the application 207. The application 206 or the application 207 is configured to cause the electronic device 200 to receive a live stream of image frames from the digital camera unit 214. Herein, 'live' indicates that the stream of image frames is not permanently stored in the electronic device 200 but rather live image data or viewfinder image data provided to the display 212.

The application 206 or the application 207 is further configured to cause the electronic device 200 to display the received live stream of image frames on the display 212.

Figure 5:
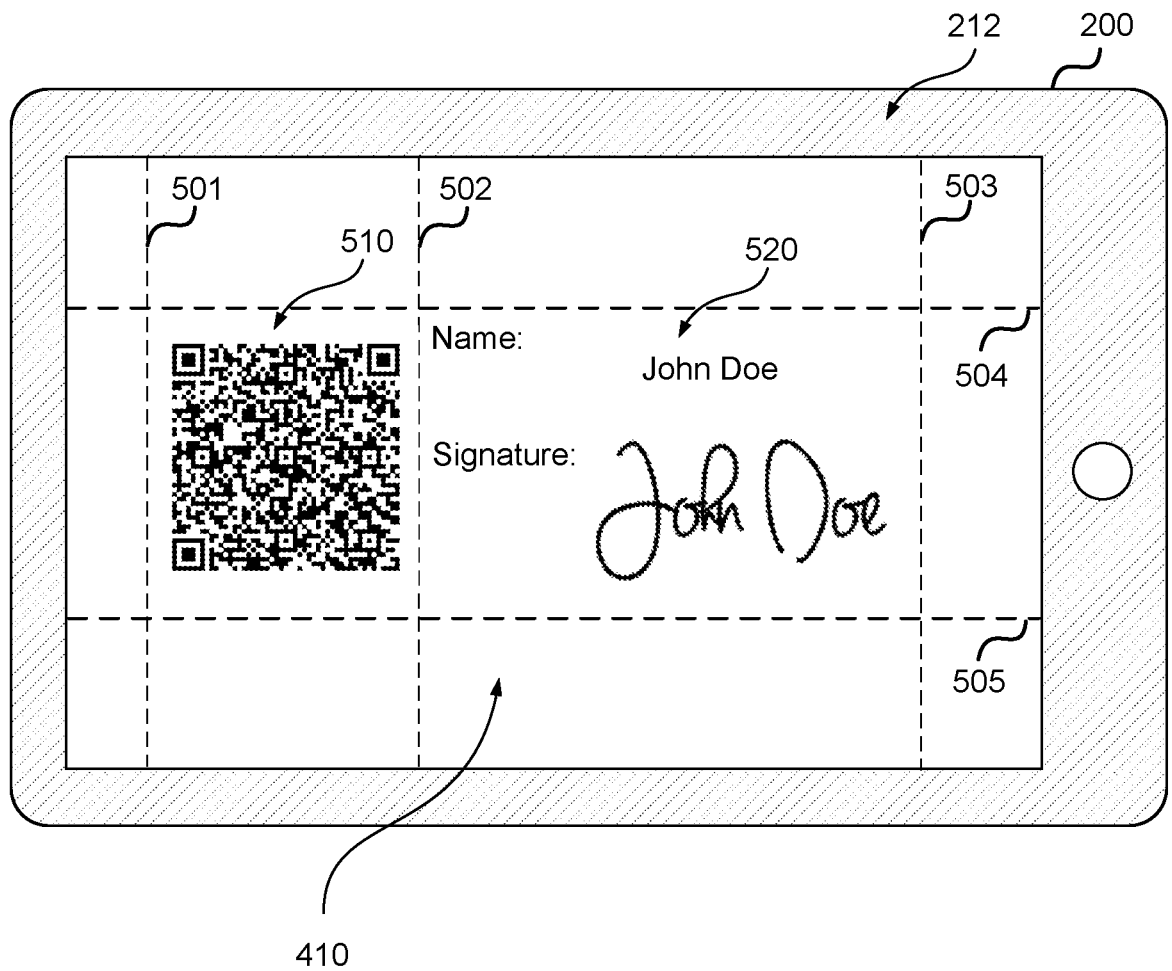
FIG. 5 illustrates an example view of an electronic device with a displayed guideline pattern, in accordance with an example embodiment.

The application 206 or the application 207 is further configured to cause the electronic device 200 to display a guideline pattern 501-505 on the display 212 overlaid on the displayed live stream of image frames. The guideline pattern 501-505 defines at least a first target area 510 and a second target area 520. FIG. 5 illustrates an example view of the electronic device 200 with a guideline pattern 501-505 displayed on the display 212, in accordance with an example embodiment. As shown, the example guideline pattern comprises three vertical dash lines 501, 502, 503 and two horizontal dash lines 504, 505. The dash lines 501-505 form the first target area 510 and the second target area 520. In the shown example, the first target area 510 is to be overlaid on the machine-readable code sub-section 411 of the document 400 of FIG. 4 as displayed on the display 212. Further in the shown example, the second target area 520 is to be overlaid on the wet ink signature sub-section 412 and optionally the name sub-section 413 of the document 400 of FIG. 4 as displayed on the display 212. It is to be understood that the guideline pattern 501-505 and the defined first and second target areas 510, 520 are merely examples. Any suitable guideline pattern and/or target area shapes and/or target area layouts may be used.

The application 206 or the application 207 may be further configured to cause the electronic device 200 to display the second target area 520 closer to the center of the display 212 than the first target area 510. This may facilitate optimizing the image quality of the captured images, e.g. by avoiding lens distortions and the like that may get worse nearer the lens edges.

The application 206 or the application 207 may be further configured to cause the electronic device 200 to apply e.g. automatic focus adjustment and/or automatic exposure adjustment of the digital camera unit 214, for example continuously, periodically, or in response to a given trigger event such as not being able to decode the read content.

The application 206 or the application 207 is further configured to cause the electronic device 200 to read the content of a first image frame section of a current image frame of the received live stream of image frames. The first image frame section is a section of the current image frame that is overlaid by the first target area 510.

The application 206 or the application 207 is further configured to cause the electronic device 200 to apply the multidimensional machine-readable code decoder 208 to the read content in order to interpret the read content.

When the read content is successfully interpreted and a precondition is met, the application 206 or the application 207 is further configured to cause the electronic device 200 to capture at least a second image frame section of the current image frame. The second image frame section is a section of the current image frame that is overlaid by the second target area 520. The image capture may be performed automatically, i.e. without user input.

In an embodiment, the successfully interpreted read content may comprise document information that identifies a document (such as document 400 of FIG. 4) associated with a handwritten signature (such as the handwritten signature in the wet ink signature sub-section 412 of the document 400 of FIG. 4) within the second image frame section. The document information may further identify e.g. a clinical trial, a clinical trial participant (e.g. a blinded identification), consent of the clinical trial participant, a clinical trial site, a clinical trial sponsor, a clinical trial type (such as Parkinson's or cancer/oncology), one or more standard protocols used in a clinical trial, a clinical trial phase (such as one of phases I-IV, consent, or re-consent), a clinical trial blinding type, and/or other properties of a clinical trial, associated with the document (such as document 400 of FIG. 4). In an example case of re-consent, wherein the trial setting has been updated and the changes are such that the participant needs to be informed about them (i.e. a re-consent situation), it may be the original and signed consent document that is identified. In such a case, the original consent document may still identify the clinical trial. The precondition may comprise the document identified by the document information being recognized by the application 206 or the application 207, thus allowing e.g. ensuring that the end-user signs a correct document.

In an embodiment, the precondition may comprise the successfully interpreted read content comprising signature information that indicates the presence of a handwritten signature within the second image frame section.

Alternatively/additionally, the precondition may comprise the first image frame section being successfully recognized as containing a first region for a multidimensional machine-readable code (such as the multidimensional machine-readable code sub-section 411 of the document 400 of FIG. 4), and the precondition may further comprise the second image frame section being successfully recognized as containing a second region for a handwritten signature (such as the wet ink signature sub-section 412 of the document 400 of FIG. 4).

Alternatively/additionally, the precondition may comprise recognizing that the second image frame section is not blank. This allows avoiding capturing images of documents that have not been signed yet.

In an embodiment, the application 206 or the application 207 may be further configured to cause the electronic device 200 to store the captured at least second image frame section at the electronic device 200. Alternatively/additionally, the application 206 or the application 207 may be further configured to cause the electronic device 200 to transmit at least the captured second image frame section to the storage server 120. The storing and/or the transmission of the captured at least second image frame section may be performed automatically, i.e. without user input. The application 206 or the application 207 may be further configured to cause the electronic device 200 to store the document information in association with the stored at least second image frame section. Furthermore, the application 206 or the application 207 may be further configured to cause the electronic device 200 to transmit the document information to the storage server 120, e.g. to be stored therein in association with the transmitted at least second image frame section.

The following describes the use of the electronic device 200 from the point of view of the end-user.

When the end-user points the digital camera 214 of the electronic device 200 at the signature section 410 of the document 400 and activates the signature acquisition feature (application 206 or 207) of the electronic device 200, a live video feed will be rendered on the display 212 so that the printed signature section 410 will be displayed on the display 212. In other words, the machine-readable code sub-section 411, the wet ink signature sub-section 412, and the name sub-section 413 (when present) are displayed on the display 212.

The application 206 or 207 draws a set of guide lines 501-505 overlaid on the live video feed on the display 212. The guidelines will guide the end-user when he/she attempts to photograph the wet ink signature sub-section 412.

Guided by these overlay guidelines, the end-user can perform a set of natural actions:

rotation of the electronic device 200 around any of the three 3D axes (x, y, z) of the electronic device 200, and/or translation or moving of the electronic device 200 along each of the three 3D axes (x, y, z) of the electronic device 200.

Once the end-user manages to align the printed QR code (or the like) in the machine-readable code sub-section 411 with the first target area 510, the other elements of the signature section 410 (i.e. the name sub-section 413 and the wet ink signature sub-section 412) will also be properly aligned on the display 212 and thus in the camera view.

As discussed above, the ratio between the width of the machine-readable code sub-section 411 ('w') and the entire length of the signature section 410 ('L') may be known by the application 206 or 207. When this ratio is known, the application 206 or 207 can calculate the size of the wet ink signature sub-section 412.

Automatic camera focus and/or exposure adjustments may be performed by the electronic device 200, and thus the on-screen rendering of the wet ink signature may also be simultaneously adjusted. Obtaining an identifiable image of the multidimensional machine-readable code (such as a QR code or the like) results in obtaining an identifiable image of the wet ink signature too.

Once the wet ink signature is captured (digitized) by the application 206 or 207, it can be sent directly to a remote device (e.g. a company server) or saved in the electronic device 200 for further reference.

Figure 3:
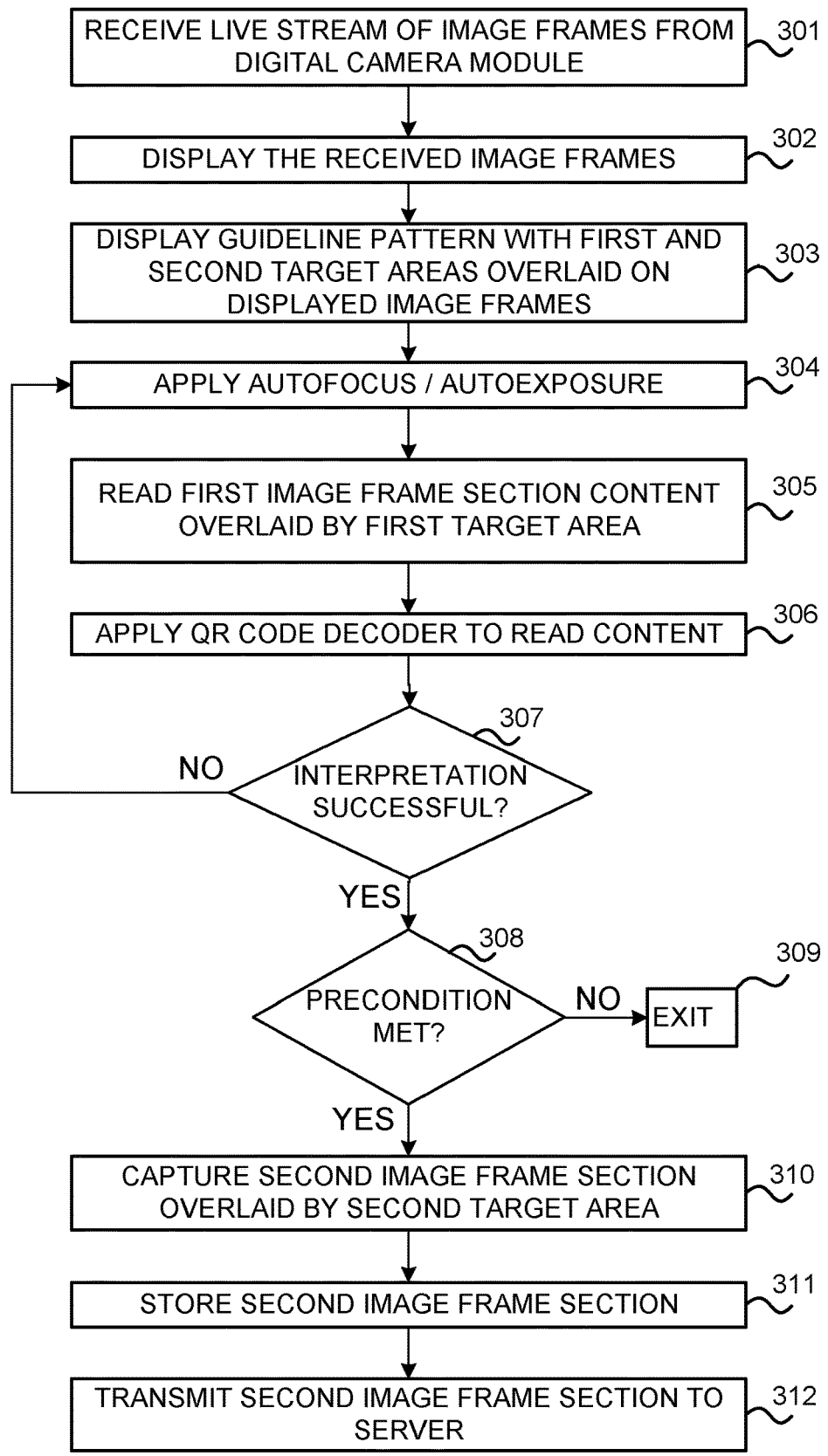
FIG. 3 illustrates an example flow diagram of a method of signature digitizing, in accordance with an example embodiment.

FIG. 3 illustrates an example flow diagram of a method 300 of signature digitizing, in accordance with an example embodiment.

At operation 301, a live stream of image frames from a digital camera unit of the electronic device is received at an electronic device.

At operation 302, the received live stream of image frames is displayed on a display of the electronic device.

At operation 303, a guideline pattern is displayed on the display overlaid on the displayed live stream of image frames. The guideline pattern defines at least a first target area and a second target area.

At optional operation 304, automatic focus adjustment and/or automatic exposure adjustment of the digital camera unit may be applied by the electronic device.

At operation 305, the content of a first image frame section of a current image frame of the received live stream of image frames is read by the electronic device. The first image frame section is overlaid by the first target area.

At operation 306, a multidimensional machine-readable code decoder is applied to the read content by the electronic device in order to interpret the read content.

At operation 307, it is determined whether the interpretation of the read content was successful. If yes, the method 300 proceeds to operation 308. If not, the method 300 returns to operation 304 or 305.

At operation 308, it is determined whether a precondition is met. If yes, the method 300 proceeds to operation 310. Otherwise, the method 300 exits, operation 309. Alternatively, the method 300 may return to operation 304 or 305 (not shown in FIG. 3).

At operation 310, at least a second image frame section of the current image frame is captured by the electronic device, such that the second image frame section is overlaid by the second target area.

At optional operation 311, the captured at least second image frame section may be stored at the electronic device.

At optional operation 312, at least the captured second image frame section may be transmitted to a storage server.

The method 300 may be performed by the electronic device 200 of FIG. 2 and/or the electronic device 600 of FIG. 6. Further features of the method 300 directly result from the functionalities and parameters of the electronic device 200 and thus are not repeated here. The method 300 can be performed by computer program(s).

FIG. 6 further illustrates an example of an electronic device 600 capable of implementing example embodiments described herein. It should be understood that the electronic device 600 as illustrated and hereinafter described is merely illustrative of one type of electronic apparatus or device and should not be taken to limit the scope of the embodiments. As such, it should be appreciated that at least some of the components described below in connection with the electronic device 600 may be optional and thus in an example embodiment may include more, less or different components than those described in connection with the example embodiment of FIG. 6. As such, among other examples, the electronic device 600 could be any suitable hand-held computer device with a digital camera.

The illustrated electronic device 600 includes a controller or a processor 602 (i.e. a signal processor, microprocessor, ASIC, or other control and processing logic circuitry) for performing such tasks as signal coding, data processing, input/output processing, power control, and/or other functions. An operating system 604 controls the allocation and usage of the components of the electronic device 600 and support for one or more application programs 606. The application programs 606 can include applications related to digitizing signatures, or any other applications.

The illustrated electronic device 600 includes one or more memory components, for example, a non-removable memory 608 and/or removable memory 610. The non-removable memory 608 may include RAM, ROM, flash memory, a hard disk, or other well-known memory storage technologies. The removable memory 610 may include flash memory (such as one or more removable flash drives) or smart cards. The one or more memory components may be used for storing data and/or code for running the operating system 604 and the applications 606. Example of data may include text, images, sound files, image data, video data, or other data sets to be sent to and/or received from one or more network servers or other devices via one or more wired or wireless networks.

The electronic device 600 can support one or more input devices 620 and one or more output devices 430. Examples of the input devices 620 may include, but are not limited to, a touchscreen 622 (i.e., capable of capturing finger tap inputs, finger gesture inputs, multi-finger tap inputs, multi-finger gesture inputs, or keystroke inputs from a virtual keyboard or keypad), a microphone 624 (i.e., capable of capturing voice input), a camera module 626 (i.e., capable of capturing still picture images and/or video images) and a physical keyboard 628. Examples of the output devices 630 may include, but are not limited to a speaker 632 and a display 634. Other possible output devices (not shown) can include piezoelectric or other haptic output devices. Some devices can serve more than one input/output function. For example, the touchscreen 622 and the display 634 can be combined into a single input/output device.

The electronic device 600 can further include one or more input/output ports 640, and a power supply 650. The illustrated components are not required or all-inclusive, as any of the components shown can be deleted and other components can be added.

The exemplary embodiments can include, for example, any suitable computer devices and the like, capable of performing the processes of the exemplary embodiments. The devices and subsystems of the exemplary embodiments can communicate with each other using any suitable protocol and can be implemented using one or more programmed computer systems or devices.

One or more interface mechanisms can be used with the exemplary embodiments, including, for example, Internet access, telecommunications in any suitable form (e.g., voice, modem, and the like), wireless communications media, and the like. For example, employed communications networks or links can include one or more satellite communications networks, wireless communications networks, cellular communications networks, 3G communications networks, 4G communications networks, Public Switched Telephone Network (PSTNs), Packet Data Networks (PDNs), the Internet, intranets, a combination thereof, and the like.

It is to be understood that the exemplary embodiments are for exemplary purposes, as many variations of the specific hardware used to implement the exemplary embodiments are possible, as will be appreciated by those skilled in the hardware and/or software art(s). For example, the functionality of one or more of the components of the exemplary embodiments can be implemented via one or more hardware and/or software devices.

The exemplary embodiments can store information relating to various processes described herein. This information can be stored in one or more memories, such as a hard disk, optical disk, magneto-optical disk, RAM, and the like. One or more databases can store the information used to implement the exemplary embodiments of the present inventions. The databases can be organized using data structures (e.g., records, tables, arrays, fields, graphs, trees, lists, and the like) included in one or more memories or storage devices listed herein. The processes described with respect to the exemplary embodiments can include appropriate data structures for storing data collected and/or generated by the processes of the devices and subsystems of the exemplary embodiments in one or more databases.

All or a portion of the exemplary embodiments can be conveniently implemented using one or more general purpose processors, microprocessors, digital signal processors, micro-controllers, and the like, programmed according to the teachings of the exemplary embodiments of the present inventions, as will be appreciated by those skilled in the computer and/or software art(s). Appropriate software can be readily prepared by programmers of ordinary skill based on the teachings of the exemplary embodiments, as will be appreciated by those skilled in the software art. In addition, the exemplary embodiments can be implemented by the preparation of application-specific integrated circuits or by interconnecting an appropriate network of conventional component circuits, as will be appreciated by those skilled in the electrical art(s). Thus, the exemplary embodiments are not limited to any specific combination of hardware and/or software.

Stored on any one or on a combination of computer readable media, the exemplary embodiments of the present inventions can include software for controlling the components of the exemplary embodiments, for driving the components of the exemplary embodiments, for enabling the components of the exemplary embodiments to interact with a human user, and the like. Such software can include, but is not limited to, device drivers, firmware, operating systems, development tools, applications software, and the like. Such computer readable media further can include the computer program product of an embodiment of the present inventions for performing all or a portion (if processing is distributed) of the processing performed in implementing the inventions. Computer code devices of the exemplary embodiments of the present inventions can include any suitable interpretable or executable code mechanism, including but not limited to scripts, interpretable programs, dynamic link libraries (DLLs), Java classes and applets, complete executable programs, Common Passenger Request Broker Architecture (CORBA) passengers, and the like. Moreover, parts of the processing of the exemplary embodiments of the present inventions can be distributed for better performance, reliability, cost, and the like.

As stated above, the components of the exemplary embodiments can include computer readable medium or memories for holding instructions programmed according to the teachings of the present inventions and for holding data structures, tables, records, and/or other data described herein. Computer readable medium can include any suitable medium that participates in providing instructions to a processor for execution. Such a medium can take many forms, including but not limited to, non-volatile media, volatile media, and the like. Non-volatile media can include, for example, optical or magnetic disks, magneto-optical disks, and the like. Volatile media can include dynamic memories, and the like. Common forms of computer-readable media can include, for example, a floppy disk, a flexible disk, hard disk, or any other suitable medium from which a computer can read.

While the present inventions have been de-scribed in connection with a number of exemplary embodiments, and implementations, the present inventions are not so limited, but rather cover various modifications, and equivalent arrangements, which fall within the purview of prospective claims.

The invention claimed is:

1. An electronic device, comprising:
a display;
a digital camera unit;
at least one processor; and
at least one memory comprising computer program code, the at least one memory and the computer program code configured to, with the at least one processor, launch an application configured to cause the electronic device to at least:
receive a live stream of image frames from the digital camera unit;
display the received live stream of image frames on the display;
display a guideline pattern on the display overlaid on the displayed live stream of image frames, the guideline pattern defining at least a first target area and a second target area;
read the content of a first image frame section of a current image frame of the received live stream of image frames, the first image frame section being overlaid by the first target area;
apply a multidimensional machine-readable code decoder to the read content in order to interpret the read content; and
in response to successfully interpreting the read content and further in response to a precondition being met:
capture at least a second image frame section of said current image frame, the second image frame section being overlaid by the second target area.

2. The electronic device according to claim 1, wherein the successfully interpreted read content comprises document information identifying a document associated with a handwritten signature within the second image frame section.

3. The electronic device according to claim 2, wherein the precondition further comprises the document identified by the document information being recognized by the application.

4. The electronic device according to claim 2, wherein the document information further identifies at least one of: a clinical trial, a clinical trial participant, consent of the clinical trial participant, a clinical trial site, a clinical trial sponsor, a clinical trial type, one or more standard protocols used in a clinical trial, a clinical trial phase, or a clinical trial blinding type, associated with the document.

5. The electronic device according to claim 1, wherein the precondition comprises the successfully interpreted read content comprising signature information indicating the presence of a handwritten signature within the second image frame section.

6. The electronic device according to claim 1, wherein the precondition comprises the first image frame section and the second image frame section being successfully recognized as containing a first region for a multidimensional machine-readable code and a second region for a handwritten signature, respectively.

7. The electronic device according to claim 1, wherein the application is further configured to cause the electronic device to:
store the captured at least second image frame section at the electronic device.

8. The electronic device according to claim 7, wherein the application is further configured to cause the electronic device to:
store the document information in association with the stored at least second image frame section.

9. The electronic device according to claim 1, wherein the application is further configured to cause the electronic device to:
transmit at least the captured second image frame section to a storage server.

10. The electronic device according to claim 1, wherein the precondition further comprises recognizing that the second image frame section is not blank.

11. The electronic device according to claim 1, wherein the application is further configured to cause the electronic device to:
display the second target area closer to the center of the display than the first target area.

12. The electronic device according to claim 1, wherein the application is further configured to cause the electronic device to:
apply at least one of automatic focus adjustment or automatic exposure adjustment of the digital camera unit.

13. The electronic device according to claim 1, wherein the application is deployed at the electronic device.

14. The electronic device according claim 1, wherein the application is deployed at an application server and launched remotely with the electronic device.

15. The electronic device according to claim 1, wherein the multidimensional machine-readable code comprises a quick response, QR, code.

16. A method of signature digitizing, comprising:
receiving, at an electronic device, a live stream of image frames from a digital camera unit of the electronic device;
displaying the received live stream of image frames on a display of the electronic device;
displaying a guideline pattern on the display overlaid on the displayed live stream of image frames, the guideline pattern defining at least a first target area and a second target area;
reading, by the electronic device, the content of a first image frame section of a current image frame of the received live stream of image frames, the first image frame section being overlaid by the first target area;
applying, by the electronic device, a multidimensional machine-readable code decoder to the read content in order to interpret the read content; and
in response to successfully interpreting the read content and further in response to a precondition being met:
capturing, by the electronic device, at least a second image frame section of said current image frame, the second image frame section being overlaid by the second target area.

17. The method according to claim 16, wherein the successfully interpreted read content comprises document information identifying a document associated with a handwritten signature within the second image frame section.

18. The method according to claim 17, wherein the precondition further comprises recognizing the document identified by the document information.

19. The method according to claim 17, wherein the document information further identifies at least one of: a clinical trial, a clinical trial participant, consent of the clinical trial participant, a clinical trial site, a clinical trial sponsor, a clinical trial type, one or more standard protocols used in a clinical trial, a clinical trial phase, or a clinical trial blinding type, associated with the document.

20. The method according to claim 16, wherein the precondition comprises the successfully interpreted read content comprising signature information indicating the presence of a handwritten signature within the second image frame section.

21. The method according to claim 16, wherein the precondition comprises the first image frame section and the second image frame section being successfully recognized as containing a first region for a multidimensional machine-readable code and a second region for a handwritten signature, respectively.

22. The method according to claim 16, further comprising:
storing the captured at least second image frame section at the electronic device.

23. The method according to claim 22, wherein the storing of the captured at least second image frame section further comprises storing the document information in association with the stored at least second image frame section.

24. The method according to claim 16, further comprising:
transmitting at least the captured second image frame section to a storage server.

25. The method according to claim 16, wherein the precondition further comprises recognizing that the second image frame section is not blank.

26. The method according to claim 16, wherein the displaying of the guideline pattern comprises displaying the second target area closer to the center of the display than the first target area.

27. The method according to claim 16, further comprising:
applying at least one of automatic focus adjustment or automatic exposure adjustment of the digital camera unit.

28. The method according to claim 16, wherein the multidimensional machine-readable code comprises a quick response, QR, code.

29. A computer program product comprising at least one non-transitory computer-readable storage medium, the non-transitory computer-readable storage medium comprising a set of instructions, which, when executed by one or more processors, cause an electronic device to at least perform:

receiving a live stream of image frames from a digital camera unit of the electronic device;

displaying the received live stream of image frames on a display of the electronic device;

displaying a guideline pattern on the display overlaid on the displayed live stream of image frames, the guideline pattern defining at least a first target area and a second target area;

reading the content of a first image frame section of a current image frame of the received live stream of image frames, the first image frame section being overlaid by the first target area;

applying a multidimensional machine-readable code decoder to the read content in order to interpret the read content; and in response to successfully interpreting the read content and further in response to a precondition being met:

capturing at least a second image frame section of said current image frame, the second image frame section being overlaid by the second target area.

* * * * *